(12) United States Patent
Shen

(10) Patent No.: US 10,476,208 B1
(45) Date of Patent: Nov. 12, 2019

(54) ELECTRIC CONNECTOR

(71) Applicant: SURE-FIRE ELECTRICAL CORPORATION, New Taipei (TW)

(72) Inventor: Chun-Lai Shen, New Taipei (TW)

(73) Assignee: Sure-Fire Electrical Corporation, New Taipei (TW)

( * ) Notice: Subject to any disclaimer, the term of this patent is extended or adjusted under 35 U.S.C. 154(b) by 0 days.

(21) Appl. No.: 16/114,587

(22) Filed: Aug. 28, 2018

(51) Int. Cl.
*H01R 13/64* (2006.01)
*H01R 13/6471* (2011.01)
*H01R 12/71* (2011.01)
*H01R 24/62* (2011.01)
*H01R 13/66* (2006.01)
*H01R 13/504* (2006.01)
*H04N 21/4363* (2011.01)
*H01R 43/02* (2006.01)
*H01R 13/6585* (2011.01)
*H01R 107/00* (2006.01)

(52) U.S. Cl.
CPC ....... *H01R 13/6471* (2013.01); *H01R 12/716* (2013.01); *H01R 13/504* (2013.01); *H01R 13/6585* (2013.01); *H01R 13/665* (2013.01); *H01R 24/62* (2013.01); *H01R 43/02* (2013.01); *H04N 21/43635* (2013.01); *H01R 2107/00* (2013.01)

(58) Field of Classification Search
CPC ........................... H01R 24/60; H01R 13/6581
See application file for complete search history.

(56) References Cited

U.S. PATENT DOCUMENTS 10,103,491 B2 * 10/2018 Ju ........................ H01R 13/04
10,109,966 B2 * 10/2018 Tsai ..................... H01R 13/502

* cited by examiner

*Primary Examiner* — Ross N Gushi
(74) *Attorney, Agent, or Firm* — Rosenberg, Klein & Lee

(57) ABSTRACT

The present discloses illustrates an electric connector. In the electric connector, an abutting part of an insulating body includes two arms extended from two rear sides thereof, and a terminal holder of a terminal set is assembled between the two arms, the terminal holder is be integrally formed with conductive terminals, and the contact parts of the conductive terminals insert into terminal slots of the abutting part, respectively; and, a circuit board is assembled in the concave space formed between the two arms, and the solder parts of the conductive terminals are electrically connected to the first contact set on the upper and lower surfaces of the circuit board. The design of the insulating body in cooperation with the terminal set having decreasing length, can significantly reduce the size of entire electric connector and almost half of the circuit board can be accommodated in the insulating body.

7 Claims, 8 Drawing Sheets

ELECTRIC CONNECTOR

BACKGROUND OF THE INVENTION

1. Field of the Invention

The present invention relates to an electric connector. More particularly, the present invention relates to an electric connector in which an insulating body comprises two arm extended from two opposite rear sides thereof in the same direction, and a length of the terminal set is also deceased, so that the entire size can be shortened and the circuit board can be accommodated in the insulating body; furthermore, a shorter terminal is not easily deformed, so as to facilitate manufacturing and assembly process, and also improve characteristic impedance for the differential signal; as a result, the high frequency signal can be transmitted faster.

2. Description of the Related Art

With rapid development of electronic technology, the higher resolution of display devices (such as monitors or TVs) and the requirement in the high transmission bandwidth cause the traditional VGA interfaces to be replaced by DVI interfaces and Display Port digital video interfaces. Furthermore, in order to display clearer images and provide higher transmission bandwidth, some related interface standards are continuously developed and updated. As a result, a high-resolution multimedia interface (HDMI) is developed to meet above-mentioned requirement. The HDMI is a fully digitalized image and audio transmission interface, and able to transmit uncompressed audio and video signals and ensure that audio and video are transmitted without attenuation, and is commonly used for audio and video transmission in consumer electronics, such as TV, computer, player, game console, integrated amplifier and digital audio.

Furthermore, in recent years, as high-definition images display gradually become mainstream video standards, the video standards are progressed from FHD standards with resolution of 1920×1080 to the UHD standards with resolution of 4K2K (3840×2160), and display devices that support 4K display technology are becoming more and more popular. The data transmission bandwidth defined in conventional standards may not meet the functional requirements of the future video transmission interface, so the new HDMI 2.1 specification is developed to define the transmission bandwidth increased from 18 Gbps defined in HDMI 2.0 to 48 Gbps, and support a variety of motion pictures with more pixels and update rate such as 4K/120 Hz or 8K/60 Hz, even up to 10K/120 Hz in cooperation with compression technology. Besides the greatly improved transmission bandwidth, the HDMI 2.1 specification also applies dynamic HDR function and low-latency transmission technology, and is compatible with the HDMI 2.0 specifications. Furthermore, the HDMI 2.1 specification supporting the resolution up to 10K pixels can also be applied to commercial, industrial, and other professional applications.

Furthermore, the conventional transmission cable for a consumer electronic product usually uses a plug connector to connect with a socket connector, and transmits various signals and power to a control circuit through a circuit board, for performing corresponding operation functions. Generally, the HDMI connector includes terminals arranged in upper and lower rows, and during the process of assembling the HDMI connector with a cable, the upper and lower rows of terminals are connected to front metal contacts of the printed circuit board by soldering, and the front metal contacts are connected to rear metal contacts of the printed circuit board through metal lines and are soldered to a plurality of core wires of the cable. However, when the size of the HDMI connector is reduced and the transmission bandwidth is greatly increased, the high frequency signal transmission may be more seriously interfered because the adjacent terminals are too close. In a conventional terminal assembly process, the terminals are inserted into the insulative body, and the structural design of insertion-type terminals for has the advantages of simple process and low defect rate, but this terminal occupies more space when being assembled with the insulating body, so the overall size of the electric connector cannot be effectively reduced; furthermore, during the assembly process, the terminal may be bent or deformed easily, and the terminal may exit or drop from the insulating body when the user plugs and unplugs the HDMI connector, so the quality of the high-frequency signal transmission is affected. Therefore, what is needed is to develop an electric connector to solve above-mentioned problems.

SUMMARY OF THE INVENTION

In order to solve conventional problems, the inventor develops an electric connector according to collected data, multiple tests and modifications, and years of research experience in the industry.

An objective of the present invention is that an abutting part of an insulating body of an electric connector includes two arms extended from two opposite rear sides thereof in the same direction, and a terminal holder integrally formed with a terminal set including upper and lower rows of conductive terminals is disposed between the two arms, and contact parts of the conductive terminals are inserted into terminal slots of the abutting part, respectively, and the circuit board is assembled in a concave space formed between the two arms, and solder parts of the conductive terminals are electrically connected to metal contacts of a first contact set on the upper and lower surfaces of the circuit board, respectively; preferably, by using the design of the insulating body in cooperation with shorter terminal set, almost half of circuit board can be accommodated in the insulating body, and the size of entire electric connector can be shorter than the conventional connector compliant with HDMI specification; furthermore, the shorter terminal is not easily deformed during the assembly process, to facilitate the manufacturing and assembly process, and also improve characteristic impedance for the differential signal, so that the high frequency signal can be transmitted faster to meet the requirement in the connector compliant with HDMI 2.1 specification that the bandwidth is up to 48 Gbps, thereby ensuring higher stability and reliability of high frequency signal transmission.

Another objective of the present invention is that a shielding housing is used to cover and position the insulating body, and the insulating body, the terminal set and the circuit board can be encased in the shielding housing, so that the ground pin of the shielding housing can be soldered and fixed on the metal contact of a second contact set corresponding thereto to form a common ground; furthermore, the shielding housing covers the insulating body and only a part of the second contact set of the circuit board is exposed out of the shielding housing, so as to improve effect of shielding and insulating the entire connector.

Another objective of the present invention is that the insulating body includes two arms extended from two opposite rear sides thereof in the same direction, and the terminal set can be placed into the insulating body with one try by using the terminal holder during assembly process, to facilitate to assemble the circuit board into the insulating body, so that the entire assembly of the connector is simpler; furthermore, the upper and lower rows of conductive terminals aligned to the metal contacts of the first contact set of the circuit board are soldered to form electrical connection, thereby achieving the effect of stable structure, easy assembly and lower cost.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
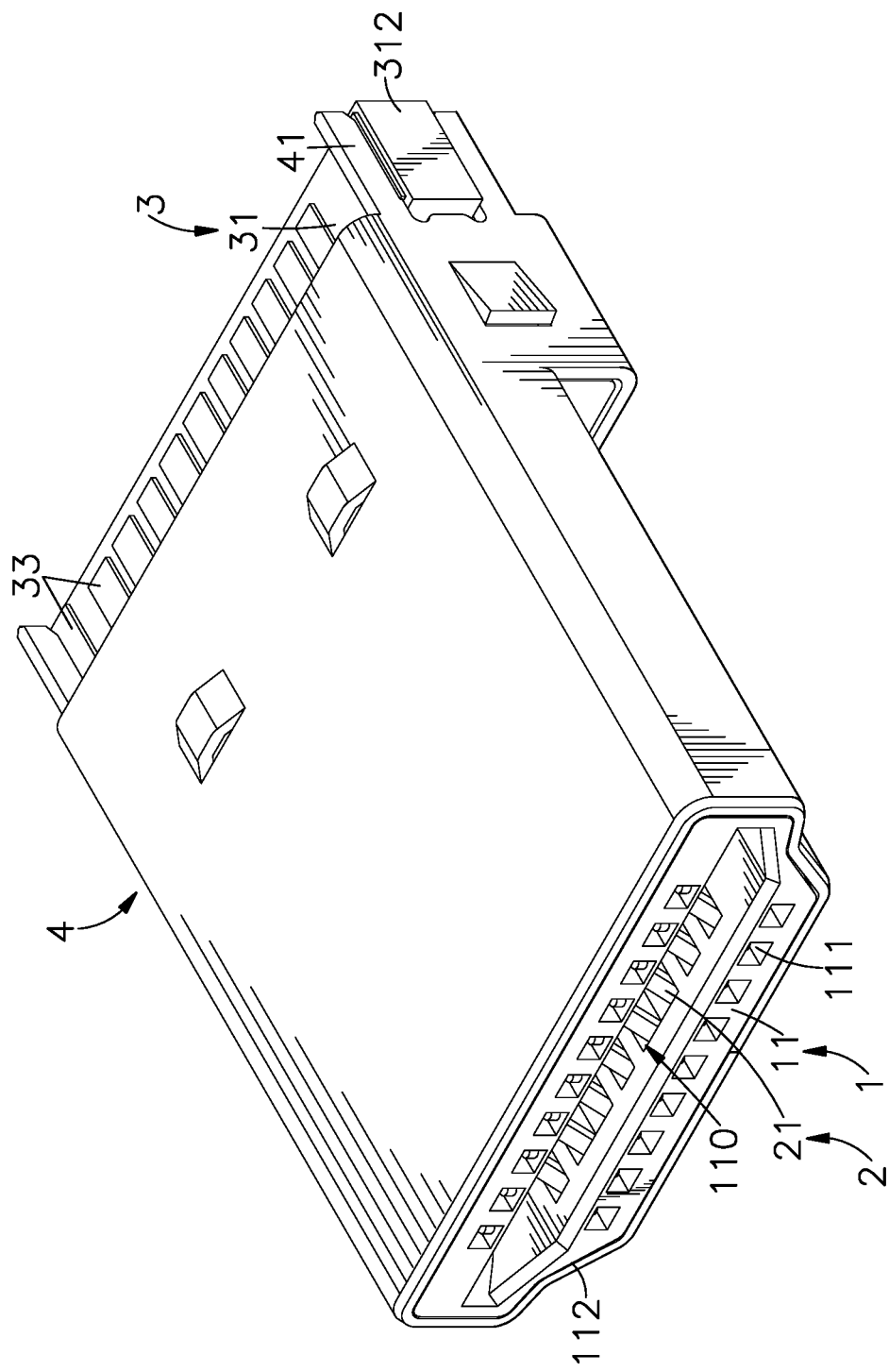
FIG. 1 is an elevational view of an electric connector of the present invention.
Figure 2:
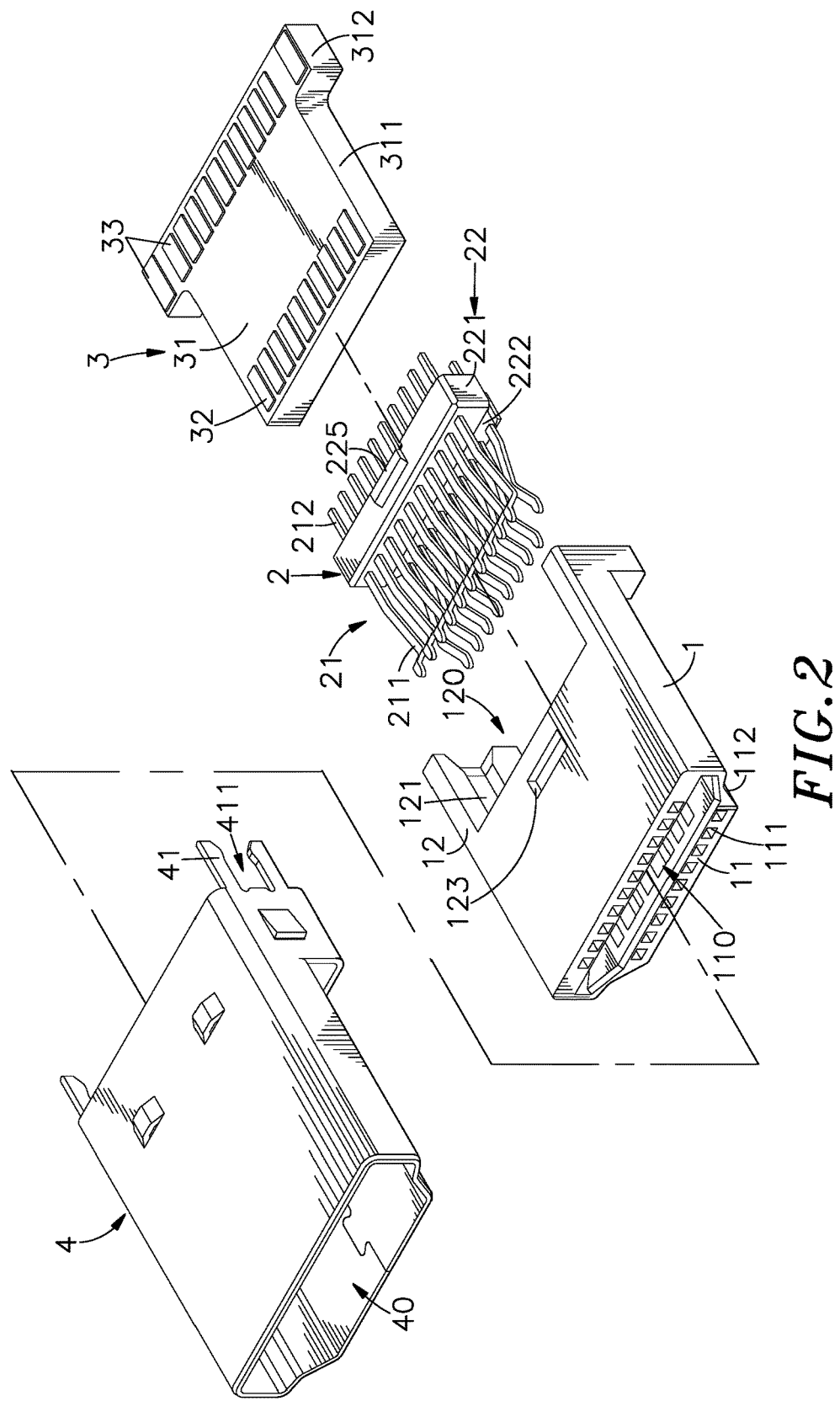
FIG. 2 is an exploded view of an electric connector of the present invention.
Figure 3:
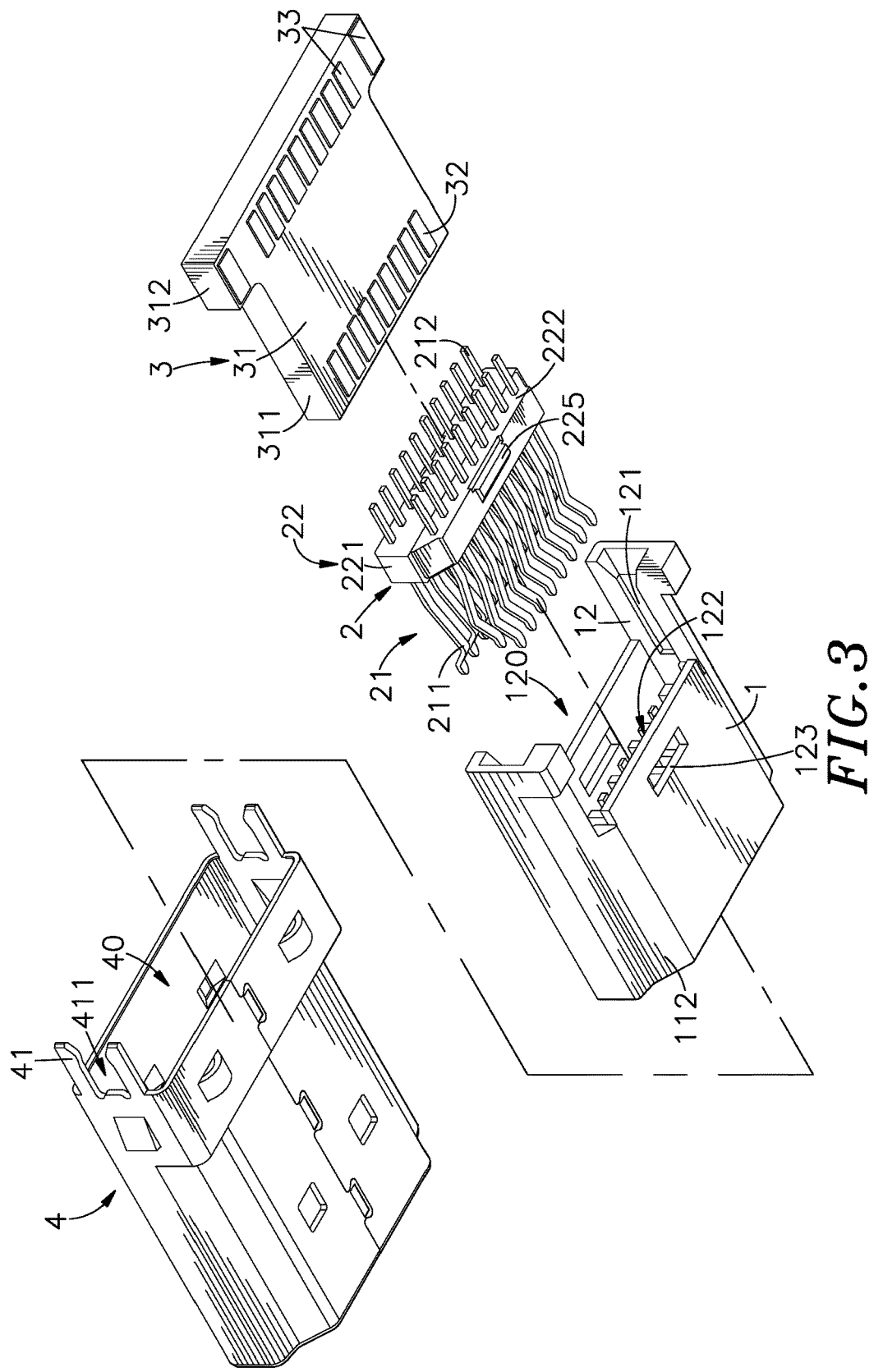
FIG. 3 is an exploded view of an electric connector of the present invention, when viewed from another angle.
Figure 4:
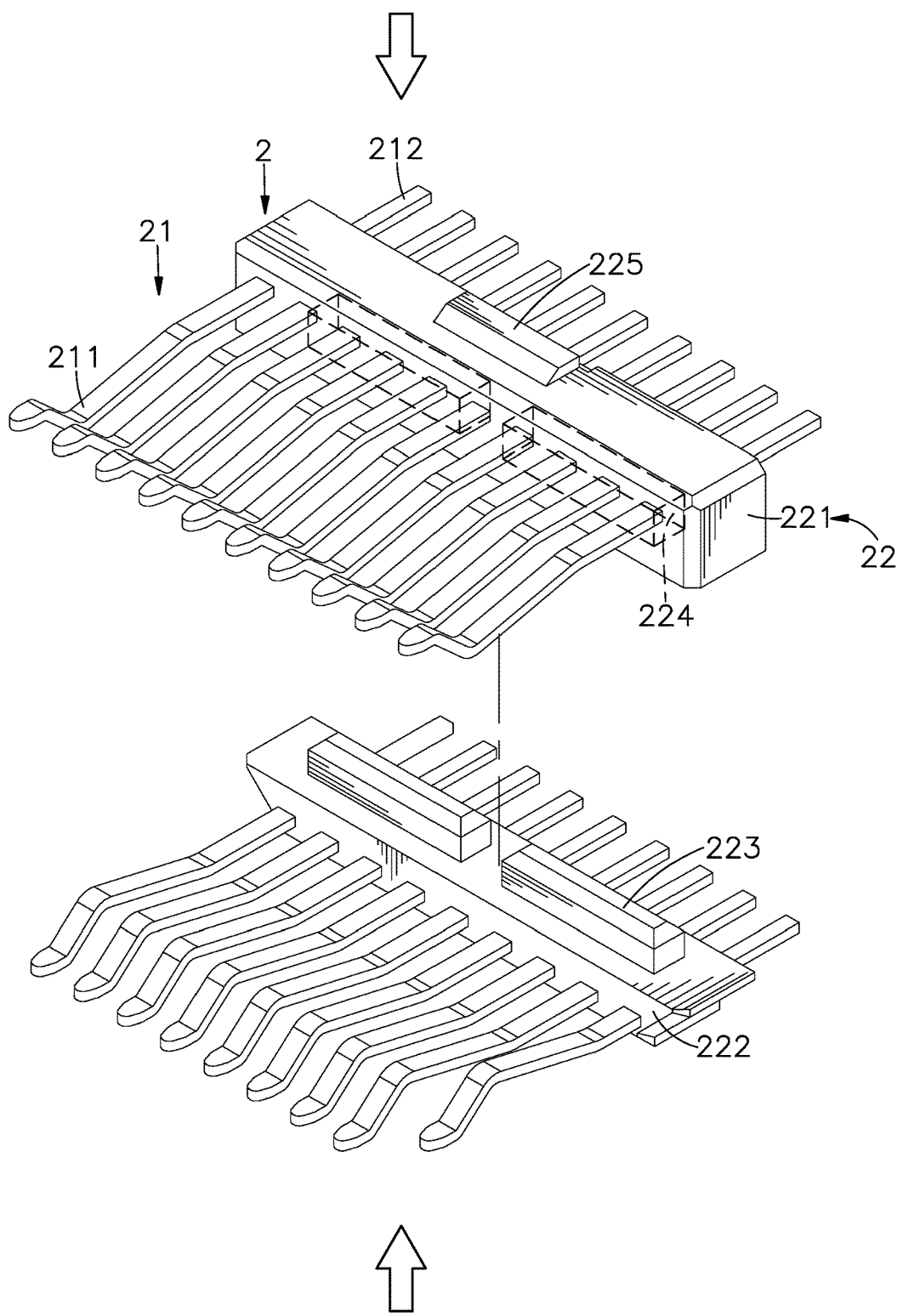
FIG. 4 is a schematic view of operation of assembling a terminal set of the present invention.

Please refer to FIGS. 1 to 4, which show an elevational view, an exploded view, another exploded view, and an operation of assembling a terminal set, according to an embodiment of the present invention, respectively. As shown in FIGS. 1 to 4, the electric connector includes an insulating body 1, a terminal set 2, a circuit board 3 and a shielding housing 4.

The insulating body 1 includes an abutting part 11 which includes a docking chamber 110 formed inside thereof, and the docking chamber 110 has an opening formed in a front part thereof, and a plurality of terminal slots 111 formed on upper and lower sidewalls thereof. The abutting part 11 includes narrowing surfaces 112 disposed at two opposite sides thereof and downward obliquely extended to a bottom surface thereof, respectively, and the abutting part 11 includes two arms 12 extended from two opposite rear sides thereof in the same direction, and a concave space 120 formed between two arms 12. Each arm 12 includes a guide slot 121 recessed on an inside wall thereof from the back to the front. The insulating body 1 includes a fixing slot 122 recessed thereon and between the two arms 12, and facing towards the abutting part 11, and the fixing slot 122 comprises a plurality of buckle grooves 123 formed on upper and lower sidewalls thereof, respectively, and the fixing slot 122 includes channels in communication with the terminal slots 111, respectively.

The terminal set 2 comprises a plurality of conductive terminals 21 arranged in an upper row and a lower row of the conductive terminal 21, respectively. In this embodiment, the upper and lower rows of the conductive terminals 21 are integrally combined with an upper base board 221 and a lower base board 222 of a terminal holder 22 by an injection molding manner, respectively; however, in actual application, the upper base board 221 and the lower base board 222 can be combined with the upper and lower rows conductive terminal 21 by an assembly manner, respectively. A front part of each conductive terminal 21 includes a contact part 211 inserted out of the terminal holder 22, and a solder part 212 disposed behind the contact part 211 and inserted out of the terminal holder 22. The upper base board 221 and the lower base board 222 of the terminal holder 22 include a plurality of positioning studs 223 and constrain holes 224 formed on relative inner sides thereof and configured to engage and fasten with each other. The upper base board 221 includes a convex buckle 225 formed on a top thereof, and the lower base board 222 includes the convex buckle 225 formed a bottom thereof.

Furthermore, the terminal set 2 comprises nineteen conductive terminals 21 disposed in the upper row and the lower row and in horizontally misaligned arrangement. The ten conductive terminals 21 disposed on the upper row are defined as, from left to right, a first pin served as a TMDS Data2+ pin, a third pin served as a TMDS Data2− pin, a fifth pin served as a TMDS Data1 Shield pin, a seventh pin served as a TMDS Data0+ pin, a ninth pin served as a TMDS Data0− pin, an eleventh pin served as a TMDS Clock Shield pin, a thirteenth pin served as a CEC pin, a fifteenth pin served as a SCL pin, a seventeenth pin served as a DDC/CEC Ground pin, and a nineteenth pin served as a Hot Plug Detect pin. The nine conductive terminals 21 disposed in the lower row are defined as, in the order from left to right, a second pin served as a TMDS Data2 Shield pin, a fourth pin served as a TMDS Data1+ pin, a sixth pin served as a TMDS Data1− pin, an eighth pin served as a TMDS Data0 Shield pin, a tenth pin served as a TMDS Clock+ pin, a twelfth pin served as a TMDS Clock-pin, a fourteenth served as a Reserved (N.C. on device) pin, a sixteenth pin served as a SDA pin, and an eighteenth pin served as a +5V Power pin.

The circuit board 3 includes two opposite plate surfaces 31 in the longitudinal direction, and the plate surface 31 includes a first contact set 32 disposed on a front side thereof, and a second contact set 33 disposed behind and spaced apart from the first contact set 32, and on a rear side thereof. The second contact set 33 are electrically connected to the first contact set 32 through circuits disposed on the plate surface 31, to form electrical conduction paths, respectively. The plate surface 31 of the circuit board 3 includes plate laterals 311 formed on two opposite sides thereof, and abutting shoulder parts 312 extended outwardly from two opposite sides of rear portions of the plate laterals 311 thereof and having a gradually-increasing width.

The shielding housing 4 is integrally made by metal material or formed by assembling separate parts, the shielding housing 4 comprises a positioning space 40 formed inside thereof and in communication with front and back sides thereof, and includes a plurality of ground pins 41 longitudinally disposed on two opposite sides of the back opening of the positioning space 40 and extended outwardly, and a clamp groove 411 is formed between two adjacent ground pins 41.

Figure 5:
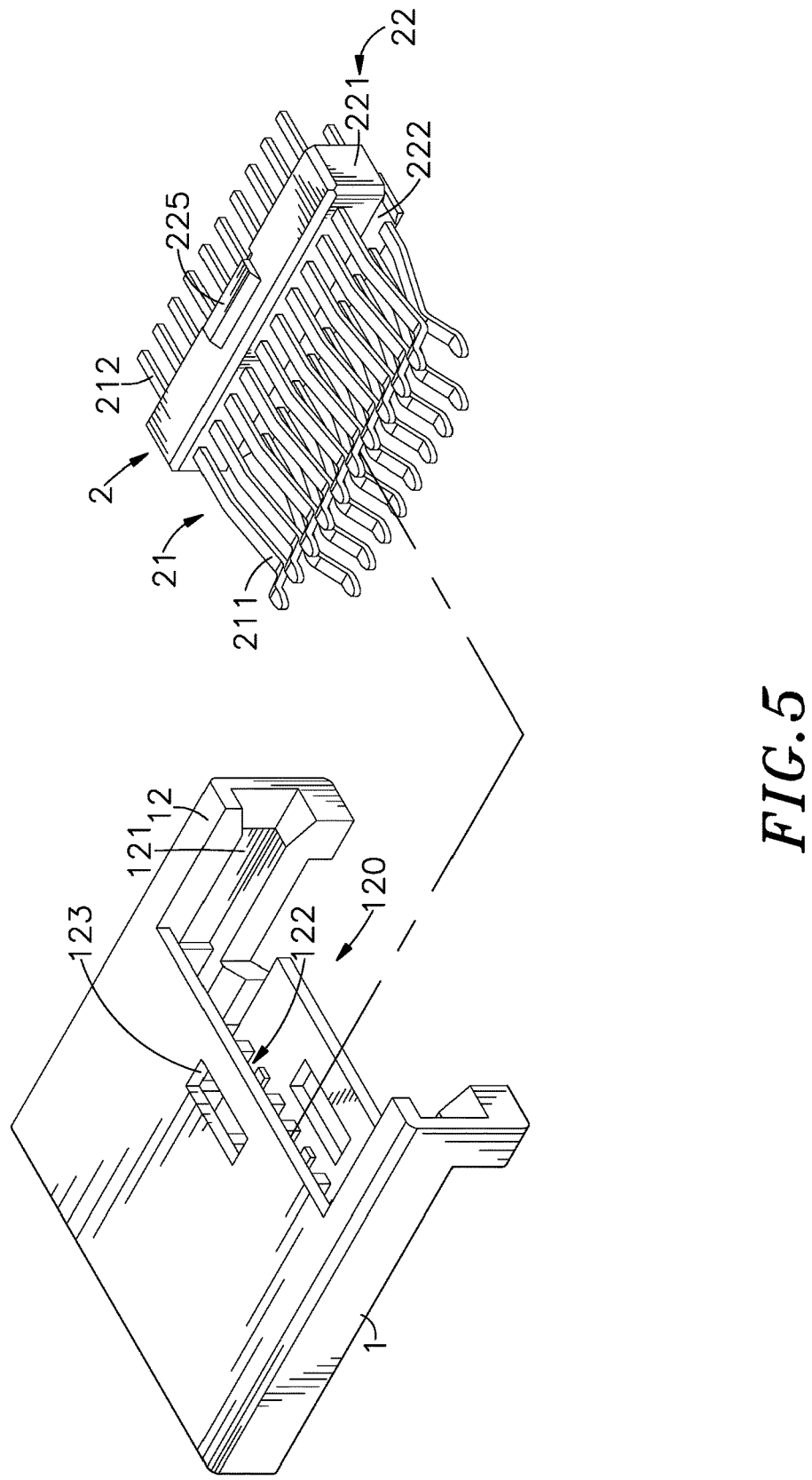
FIG. 5, is a schematic view of operation of assembling a terminal set and an insulating body of the present invention.
Figure 6:
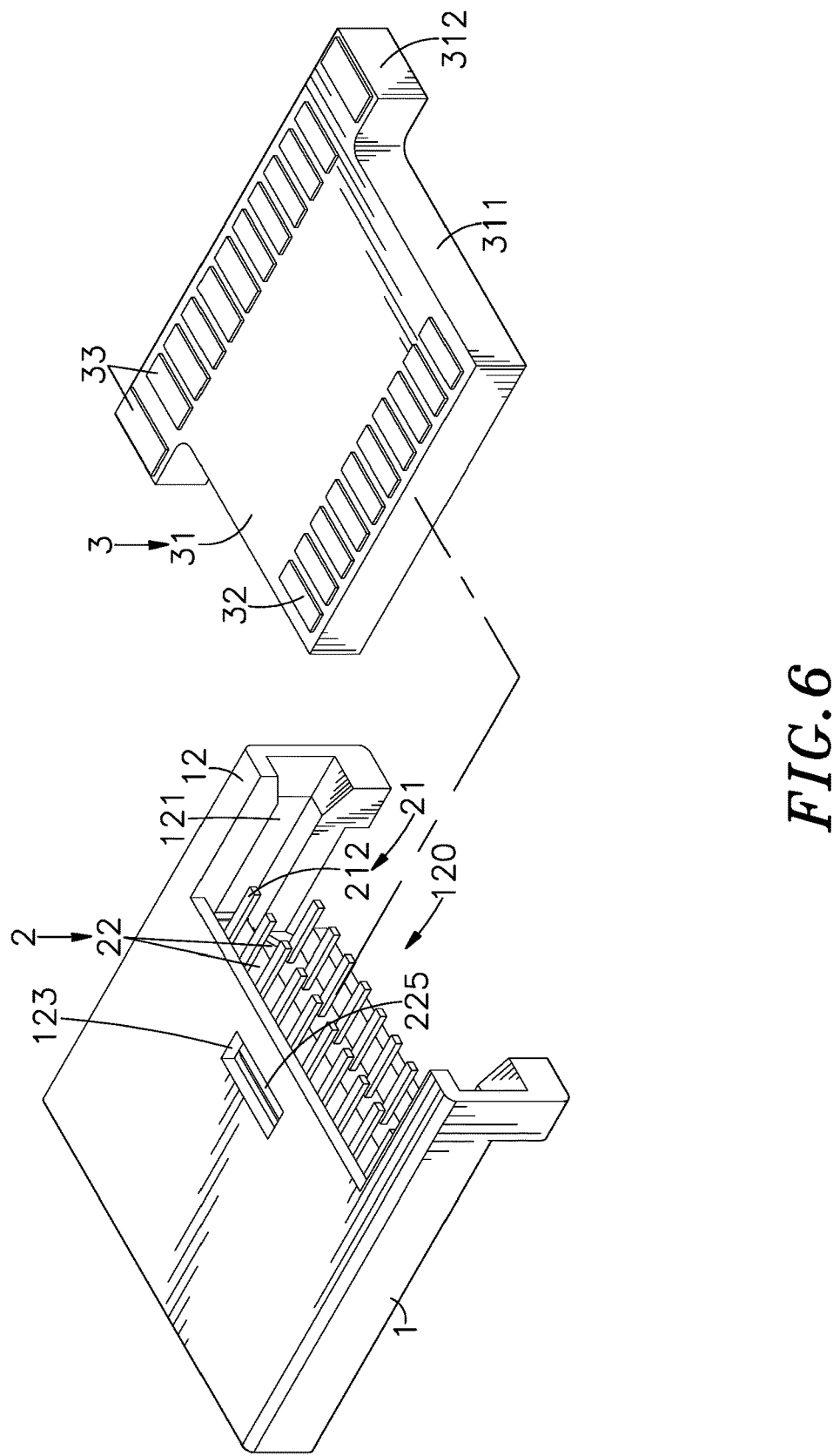
FIG. 6, is a schematic view of operation of assembling a circuit board and an insulating body of the present invention.
Figure 7:
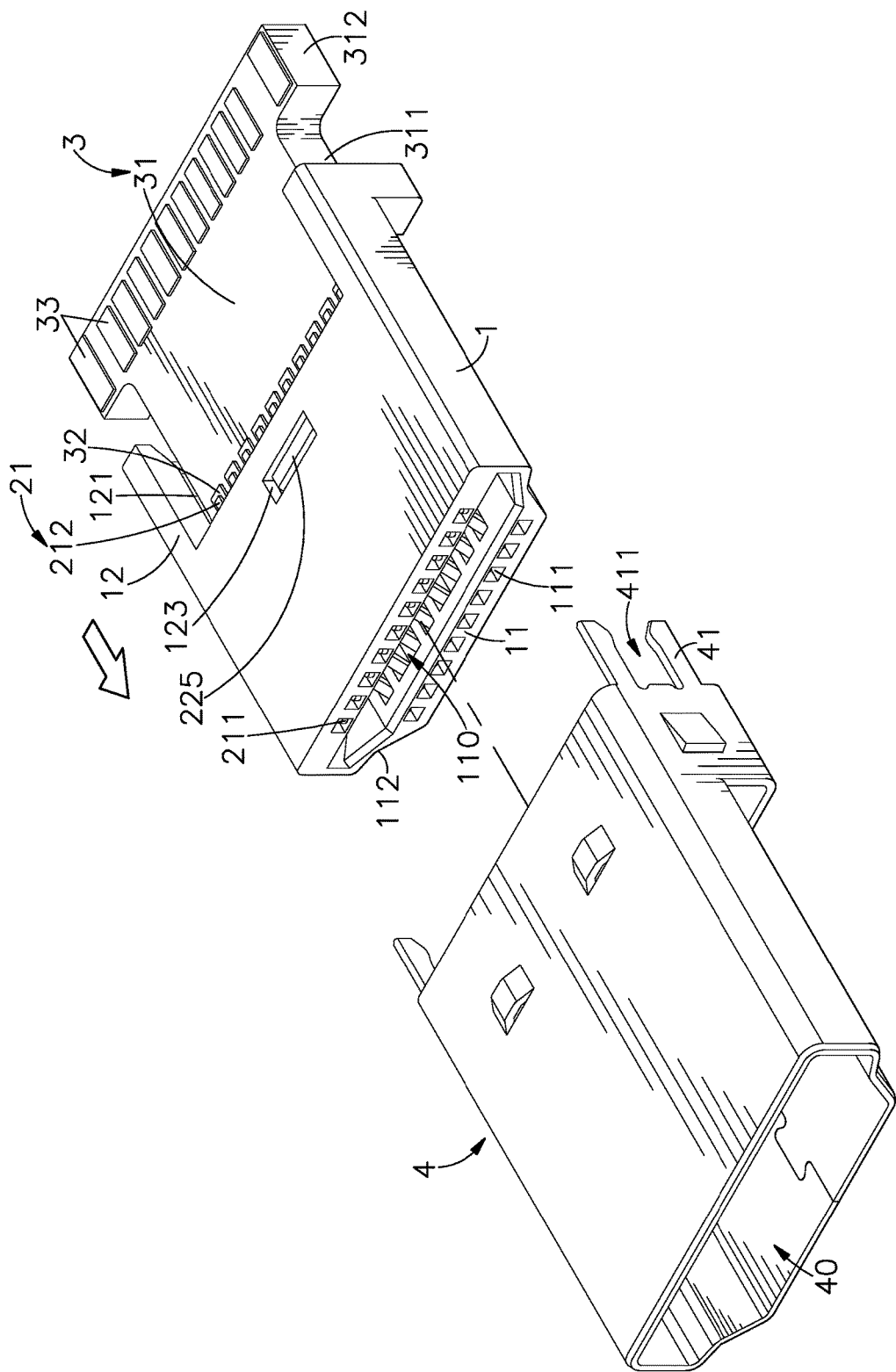
FIG. 7 is a schematic view of operation of assembling an insulating body into a shielding housing, according to the present invention.
Figure 8:
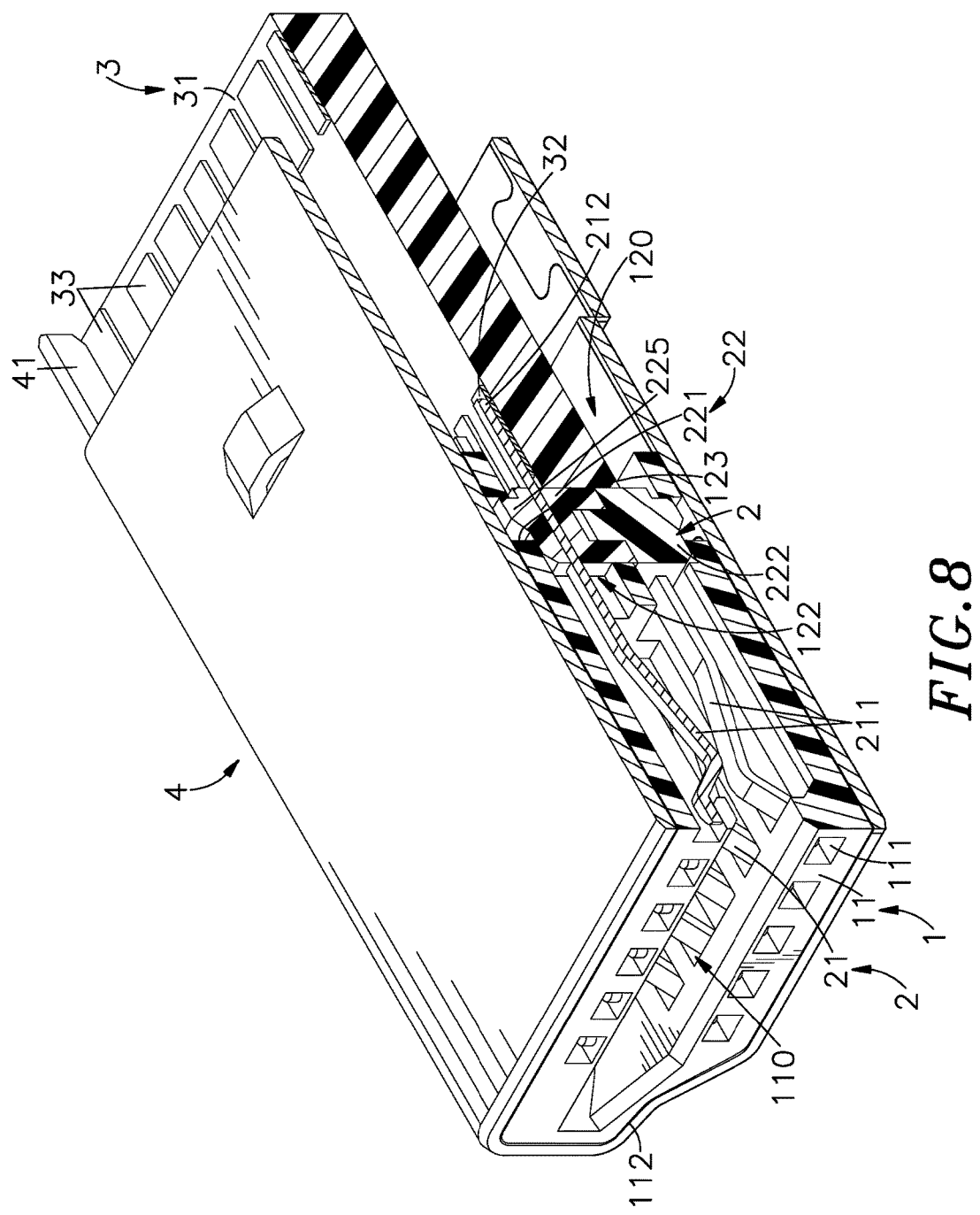
FIG. 8 is a perspective sectional view of an electric connector of the present invention.

Please refer to FIGS. 5 to 8, which show a schematic view of operation of assembling the terminal set and the insulating body, a schematic view of operation of assembling the circuit board and the insulating body, and a schematic view and a perspective sectional view of operation of assembling the shielding housing on the insulating body, according to an embodiment of the present invention, respectively. As shown in FIGS. 5 to 8, in order to assemble the electric connector of the present invention, the terminal set 2 is inserted to the insulating body 1, and the two opposite sides of the terminal holder 22 are inserted into the concave space 120 towards the fixing slot 122 along the two arms 12, and the contact parts 211 of the upper and lower rows of the conductive terminals 21 are inserted out of the terminal slots 111 corresponding thereto and into the docking chamber 110. After the terminal holder 22 is engaged into the fixing slot 122, the convex buckles 225 of the terminal holder 22 can be clasped into the buckle grooves 123 for integral combination; and, at the same time, the solder parts 212 of the upper and lower rows of the conductive terminals 21 are expose out of the concave space 120. During above-mentioned assembly process, the terminal set 2 can be assembled with the insulating body 1 with one try and the insulating body 1 can also provide stable blocking and positioning function, so as to prevent the terminal set 2 from dropping out of the insulating body 1 during assembly process.

Next, in order to assemble the circuit board 3 into the insulating body 1, the plate laterals 311 can be inserted into the concave space 120 along the guide slots 121 of the two arms 12, and the front end of the circuit board 3 can be abutted with the terminal holder 22 of the terminal set 2, and the solder parts 212 of the upper and lower rows of the conductive terminals 21 can be aligned to, disposed behind, and then electrically connected to the first contact set 32 of the plate surface 31 by using surface mount technology (SMT). The structural design the of the arm 12 can provide effect of guiding and constraining the plate laterals 311 of the circuit board 3 during the process of engaging the plate laterals 311 of the circuit board 3 into the guide slot 121 of the two arms 12. This structural design has simple structure and can provide simpler process of assembling the entire connector. Furthermore, the upper and lower rows of the conductive terminals 21 are aligned to and soldered with the first contact set 32 of the circuit board 3 to form electrical connection, so that the circuit board 3 can be firmly combined in the insulating body 1 without being loosened or separated from the insulating body 1 easily, thereby achieving the effect of stable structure, easy assembly and lower cost.

In an embodiment, the insulating body 1 can be covered and positioned by the shielding housing 4, and the insulating body 1 with the terminal set 2 and the circuit board 3 can be encased into the positioning space 40 through the rear opening of the shielding housing 4, and after the insulating body 1 is inserted and positioned, the abutting shoulder parts 312 at two opposite rear sides of the circuit board 3 can be fastened in the clamp grooves 411 between the two adjacent ground pins 41, respectively, and a part of the second contact set 33 of the circuit board 3 can be exposed out of the back side of the shielding housing 4. Each two adjacent ground pins 41 can be abutted with the metal contacts of the second contact set 33 for grounding, respectively, and then connected together by using surface mount technology (SMT) to form electrical connection. Besides the metal contacts, the second contact set 33 can be connected to the transmission cable, and the shielding housing 4 can be combined with an insulation housing configured to passing the transmission cable, so as to form the plug connector or wire-end connector compliant with the HDMI 2.1 specification.

In this embodiment, the metal contacts of the second contact set 33 of the circuit board 3 located at the outermost sides of the abutting shoulder parts 312 are used for grounding, and after the shielding housing 4 covers on the insulating body 1, the ground pins 41 can be soldered on the corresponding metal contacts of the second contact set 33 to form a common ground, respectively, so as to improve path and density of grounding conduction and also reduce electromagnetic wave interference and crosstalk interference occurred during the high frequency signal transmission; but, the present invention is not limited thereto; alternatively, the shielding housing 4 may be omitted upon actual application or different purpose. It should be noted that various equivalent structural changes, alternations or modifications based on the descriptions and figures of present disclosure are all consequently viewed as being embraced by the spirit and the scope of the present disclosure set forth in the claims.

When the plug connector of the present invention is inserted and connected into a plug connector adapted to a consumer electronic product, the abutting part 11 of the insulating body 1 is inserted into the slot, and a tongue plate is inserted into the docking chamber 110 of the abutting part 11, and the conductive terminal 21 of the terminal set 2 are abutted with and contact the corresponding contacts on the tongue plate to form electrical connection, respectively, for transmission of uncompressed audio and video signal. The design that the concave space 120 is formed between the two arms 12 at two opposite rear sides of the insulating body 1 and the terminal set 2 have shorter length, can significantly reduce the size of entire electric connector, and the shorter terminal is not easily deformed during the assembly process, so as to facilitate the manufacturing process and assembly of the connector product and also improve the characteristic impedance of the terminal set 2 for differential signal. As a result, the structural design of the insulating body 1 in cooperation with the shorter terminal set 2 can have shorter size than the conventional connector compliant with HDMI specification, and almost half of the circuit board 3 can be accommodated in the insulating body 1, and the shielding housing 4 can also cover the insulating body 1, and only a part of the second contact set 33 of the circuit board 3 can be exposed out of the shielding housing 4 to connect the transmission cable, so that the high frequency signal transmission of the connector can be faster, thereby meeting the requirement in the connector compliant with HDMI 2.1 specification that the bandwidth is up to 48 Gbps, and also ensuring higher stability and reliability of high frequency signal transmission.

The main concept of the present invention is that the terminal holder 22 of the terminal set 2 is assembled between the two arms 12 at two opposite rear sides of the abutting part 11 of the insulating body 1, and the contact parts 211 of the conductive terminals 21 are inserted into the terminal slots 111 of the abutting part 11, respectively, and the circuit board 3 is assembled in the concave space 120 formed between the two arms 12, and the solder parts 212 of the conductive terminals 21 are electrically connected to the first contact set 32 on the upper and lower surfaces of the circuit board 3, respectively, and a part of the second contact set 33 can be exposed out of the shielding housing 4 to connect the transmission cable. The structural design of the insulating body 1 in cooperation with the terminal set 2 having decreasing length, can significantly shorten the size of entire electric connector, and almost half of the circuit board 3 can be accommodated in the insulating body 1; furthermore, the shorter terminal is not easily deformed during assembly process, to facilitate the manufacturing and assembly process, and also improve characteristic impedance for the differential signal, so that the high frequency signal can be transmitted faster, to meet the requirement in the connector compliant with HDMI 2.1 specification that the bandwidth is up to 48 Gbps.

The present invention disclosed herein has been described by means of specific embodiments. However, numerous equivalent structural changes, alternations, modifications, variations, or enhancements can be made thereto by those skilled in the art without departing from the spirit and scope of the disclosure set forth in the claims.

What is claimed is:

1. An electric connector, comprising:
an insulating body including an abutting part, and the abutting part includes a docking chamber formed inside thereof and narrowing surfaces disposed at two opposite sides thereof respectively extending obliquely downward to a bottom surface thereof, and the docking chamber includes a plurality of terminal slots formed on upper and lower sidewalls thereof, and the abutting part includes two arms extended from two opposite rear sides thereof in the same direction, wherein a concave space is formed between the two arms;
a terminal set including an upper row and a lower row of conductive terminals;
a terminal holder integrally formed with the conductive terminals, and disposed between the two arms, wherein each of the conductive terminal comprises includes a contact part formed at a front portion thereof and inserted through the terminal slot corresponding thereto and into the docking chamber, and a solder part formed behind the contact part and exposed in the concave space between the two arms; and
a circuit board disposed in the concave space between the two arms, and including a first contact set electrically connected to the solder parts of the conductive terminals, and disposed on upper and lower plate surfaces thereof, and a second contact set disposed behind the first contact set and spaced apart from the first contact set, and the second contact set is electrically connected to the first contact set through circuit, so as to form an electrical conduction path.

2. The electric connector according to claim 1, wherein the insulating body includes a fixing slot recessed thereon, formed between the two arms thereof and facing towards the abutting part, and the fixing slot includes a plurality of buckle grooves respectively formed on upper and lower sidewalls thereof, and the fixing slot is in communication with the plurality of terminal slots, and the terminal holder of the terminal set is engaged into the fixing slot, and the terminal holder includes convex buckles disposed on upper and lower sides thereof and configured to respectively clasp the plurality of buckle grooves.

3. The electric connector according to claim 2, wherein the terminal set includes nineteen conductive terminals disposed in the upper row and the lower row and in horizontally misaligned arrangement, the upper and lower rows of the conductive terminals are integrally combined with an upper base board and a lower base board of the terminal holder by injection molding manner, and the upper base board and the lower base board comprises a plurality of positioning studs and constrain holes formed on relative inner sides thereof and configured to engage and fasten with each other.

4. The electric connector according to claim 1, wherein each of the two arms of the insulating body includes a guide slot recessed on an inside wall thereof from the back to the front, and the plate surface of the circuit board includes plate laterals formed at two opposite sides thereof and inserted into the concave space along the guide slot, so as to align the solder parts of the upper and lower rows of the conductive terminals to the first contact set.

5. The electric connector according to claim 1, wherein the terminal set is inserted through the insulating body and includes nineteen conductive terminals disposed in the upper and lower rows and in horizontally misaligned arrangement, respectively, so as to form a plug compliant with HDMI 2.1 specification.

6. The electric connector according to claim 1, further comprising a shielding housing configured to cover and position the insulating body, and having a positioning space formed inside thereof and in communication with front and back sides thereof, and the second contact set of the circuit board being exposed out of the back side of the shielding housing and being configured to connect to the transmission cable.

7. The electric connector according to claim 6, wherein the circuit board includes abutting shoulder parts formed at two opposite sides of a back part thereof and extended outwardly, and the shielding housing includes a plurality of ground pins longitudinally disposed on two opposite sides of back opening of the positioning space and extending outwardly, and clamp grooves respectively formed between two adjacent ground pins of the plurality of ground pins, and the abutting shoulder parts are respectively engaged into the clamp grooves, and the ground pins are respectively electrically connected to the corresponding ones of the second contact set on the circuit board to form a common ground.

* * * * *